United States Patent [19]
Gregory

[11] Patent Number: 5,947,311
[45] Date of Patent: Sep. 7, 1999

[54] PLASTIC CLOSURE WITH LINER HAVING A PERIPHERY SPACED FROM THE SKIRT OF THE CLOSURE AND A SEALING SURFACE ANGLED AXIALLY WITH RESPECT TO THE BASE WALL OF THE CLOSURE

[75] Inventor: James L. Gregory, Toledo, Ohio

[73] Assignee: Owens-Illinois Closure Inc., Toledo, Ohio

[21] Appl. No.: 08/851,821

[22] Filed: May 6, 1997

[51] Int. Cl.[6] .................................................. B65D 53/00
[52] U.S. Cl. ........................ 215/341; 215/252; 215/307; 215/349; 215/270; 215/271
[58] Field of Search .................... 215/252, 307, 215/316, 260, 270, 271, 341–343, 349; 264/268

[56] References Cited

U.S. PATENT DOCUMENTS

| | | |
|---|---|---|
| 1,610,583 | 12/1926 | Penn et al. . |
| 1,645,158 | 10/1927 | Russell . |
| 2,085,934 | 7/1937 | Till . |
| 2,109,805 | 3/1938 | Stewart . |
| 2,705,346 | 4/1955 | Schlabach et al. . |
| 2,906,421 | 9/1959 | Jordanoff . |
| 3,589,545 | 6/1971 | Carpenter, Jr. . |
| 4,121,728 | 10/1978 | Tagalakis et al. . |
| 4,269,321 | 5/1981 | Ichinose et al. . |
| 4,378,893 | 4/1983 | Wilde et al. . |
| 4,407,422 | 10/1983 | Wilde et al. . |
| 4,418,828 | 12/1983 | Wilde et al. . |
| 4,448,320 | 5/1984 | Kapolas ............................. 264/268 X |
| 4,458,822 | 7/1984 | Ostrowsky . |
| 4,493,427 | 1/1985 | Wolkinsky . |
| 4,506,795 | 3/1985 | Herr . |
| 4,747,502 | 5/1988 | Luenser ................................... 215/307 |
| 4,785,952 | 11/1988 | Obadia . |
| 4,818,577 | 4/1989 | Ou-Yang . |
| 4,984,703 | 1/1991 | Burzynski . |
| 5,098,629 | 3/1992 | Marsilio . |
| 5,240,131 | 8/1993 | Keller . |
| 5,265,747 | 11/1993 | Gregory et al. ......................... 215/349 |
| 5,289,932 | 3/1994 | Dimeo et al. . |
| 5,356,021 | 10/1994 | McBride et al. . |
| 5,462,187 | 10/1995 | Gregory et al. . |
| 5,650,113 | 7/1997 | Gregory et al. ..................... 215/341 X |

FOREIGN PATENT DOCUMENTS 348885  10/1960  Switzerland ............................ 215/341

*Primary Examiner*—Stephen K. Cronin
*Assistant Examiner*—Robin A. Hylton

[57] ABSTRACT

A plastic closure and method of making such a closure for a container that has a finish with a top surface portion, a cylindrical outer surface portion, and a curved portion at the juncture of the top surface portion and the outer surface portion. The closure includes a base wall, a peripheral skirt having an inner surface and threads on the inner surface of the skirt for engaging the container. The base wall has an inner planar surface and a compression molded liner is compression molded and bonded on the planar surface of the plastic closure. The peripheral portion of the liner has an outer annular inclined surface. The inclined surface tapers radially inwardly away from the base wall of the closure and is positioned for engaging the top surface portion of the finish and the inner surface of the container and is out of engagement with the outer surface of the finish of the container.

20 Claims, 5 Drawing Sheets

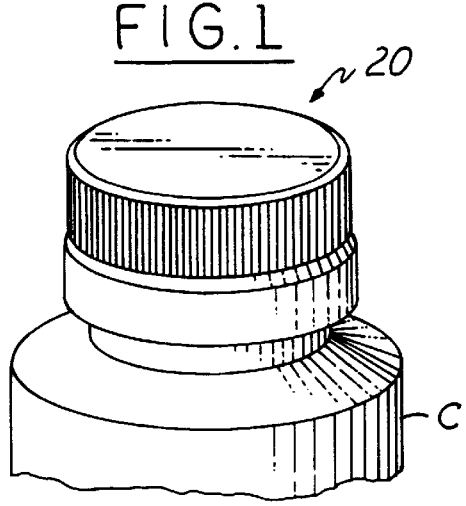
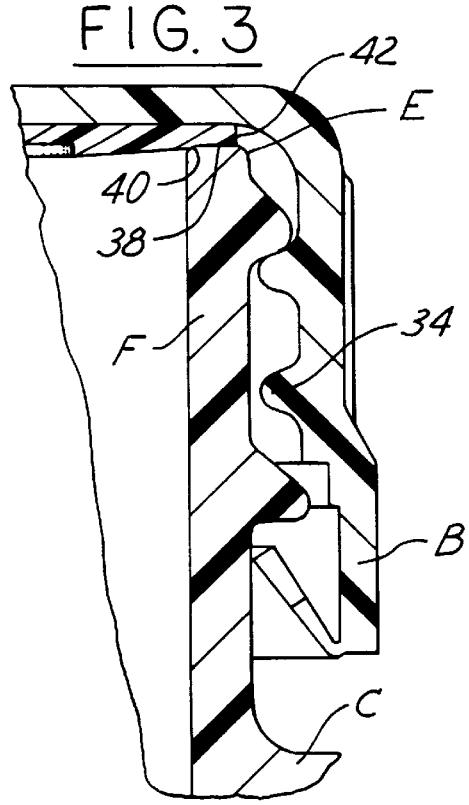
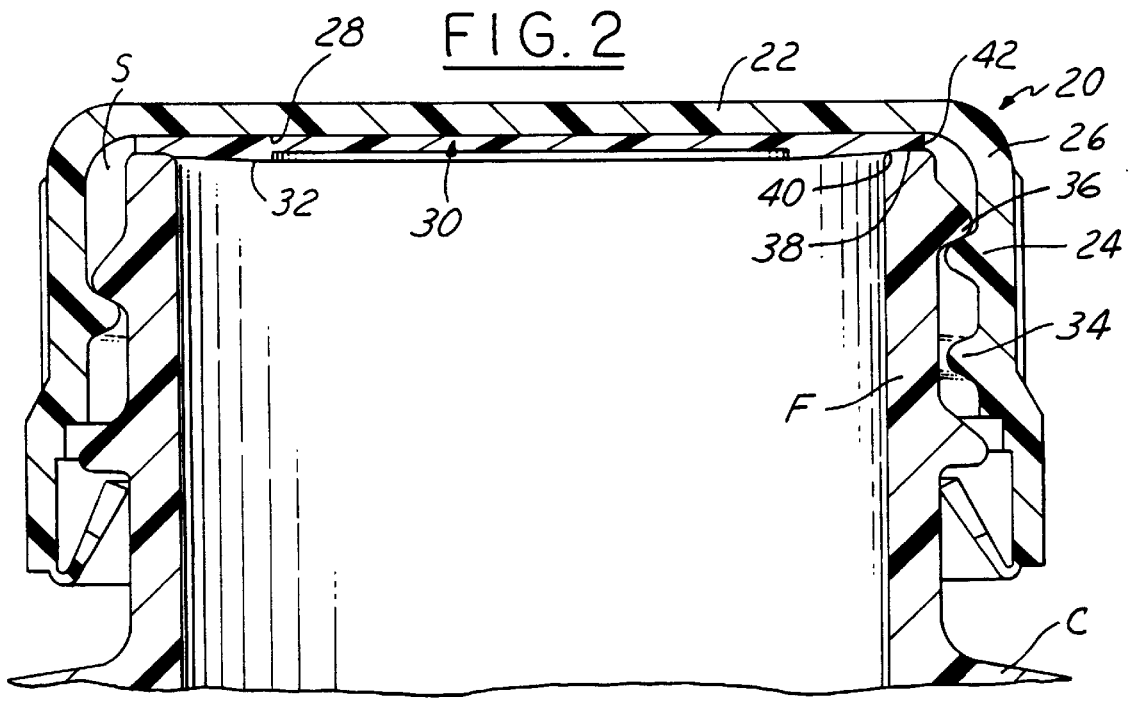

PLASTIC CLOSURE WITH LINER HAVING A PERIPHERY SPACED FROM THE SKIRT OF THE CLOSURE AND A SEALING SURFACE ANGLED AXIALLY WITH RESPECT TO THE BASE WALL OF THE CLOSURE

This invention relates to plastic closures used with glass or plastic containers.

BACKGROUND AND SUMMARY OF THE INVENTION

In order to provide a proper seal, it has been thought that it is necessary to have a seal on the top surface of the container as well as on the outer cylindrical surface of the finish or neck of the container. Thus, in compression mold liners a satisfactory seal has been provided as shown in, for example, U.S. Pat. Nos. 4,378,893, 4,407,422 and 4,418,828 incorporated herein by reference. In these patents, the closure is provided with an annular lip spaced from the base wall and defining an annular channel or recess and a plastic sealing liner is compression molded such that it is held in position by integral liner-engaging projections on the base wall and the annular lip to form a liner that has an annular sealing bead that engages the outer side wall surface of the container. In another type of plastic beverage closure shown in U.S. Pat. Nos. 4,462,502 and 4,658,976, a circular flexible resilient liner is provided which is rotatable relative to the closure and has a diameter greater than the outside diameter of the container lip. An annular projection is provided at the juncture of the base wall and skirt of the closure and preferably has a configuration when viewed in cross-section which has a horizontal portion, a vertical and a convex portion connecting the horizontal and vertical portion one to the other providing for sealing along an outer cylindrical side surface of the edge of the finish of the container. In each of the aforementioned constructions, the construction relies on the flexing of the base wall of the closure to enhance the side seal on the cylindrical surface of the container finish.

In U.S. Pat. Nos. 5,265,747 and 462,187, there is disclosed a plastic beverage closure comprising a base wall, a peripheral skirt and a plurality of threads on the inner surface of the skirt for engagement with the threads of a container which may be made of glass or plastic. The plastic closure includes a compression molded seal extending about the periphery of the inner surface of the base wall and the juncture of the base wall to the peripheral skirt. The closure includes a central axially thickened portion; a channel surrounding the thickened portion and extending radially to an annular radially thickened portion on the skirt at the juncture with the base wall. A concave surface extends from the base of the channel and merges with the surface of the annular portion. A compression molded liner is provided on the thickened portion, channel and concave surface of the closure and defines a planar sealing surface for contact with the end surface of the finish of the container and an arcuate surface for engaging the arcuate surface of a container. In another form, the inner surface of the end wall has a uniform thickness and the planar surface and the annular liner receiving surfaces are coplanar. In another form, the skirt of the closure has a radially thickened portion on its inner surface along which a portion of the liner extends.

In closures for use with oil, a closure has been used wherein the closure has a base wall with a peripheral skirt with internal threads and the base wall is planar with a uniformly thick compression molded liner thereon. The liner engages a flat upper surface of the finish and the inner edge of the finish but is not in engagement with the outer surface or the outer edge of the finish.

The above described closures have liners which are compression molded onto the closures. In the process of compression molding, a molten plastic pellet is delivered into the interior of the closure and liner forming tooling is introduced into the interior of the closure and shut off at the area into which the liner is to be formed from the remaining areas of the closure including the threads. If the shut off of the area is not achieved, molten plastic material can flash into the thread area of the closure or the liner material may be not uniformly formed in the closure, for example, creating an overfill on one side and a void on the opposite side of the closure. In such instances, the plastic closure must be scrapped.

Among the objectives of the present invention are to provide a plastic closure and a method of making the closure wherein the plastic closure has a configuration such that the plastic closure will provide an effective seal on glass and plastic containers while at the same time providing a positive shut off; wherein there is a more uniform flow of the liner material during compression molding thereby eliminating flash or voids; which can be used as a vacuum closure for containers filled with hot contents; which can be used as a closure for containers filled with non-carbonated cold liquids; and which can be used for containers containing carbonated liquids.

In accordance with the invention, the plastic closure is for a container which has a finish with a top surface portion, a cylindrical outer surface portion, and a curved portion at the juncture of the top surface portion and the outer surface portion. The closure includes a base wall, a peripheral skirt having an inner surface and threads on the inner surface of the skirt for engaging the container. The base wall has an inner planar surface and a compression molded liner is compression molded and bonded on the planar surface of the plastic closure. The liner has a periphery spaced radially inwardly of the peripheral skirt and the threads on the skirt. The peripheral portion of the liner has an outer annular inclined surface. The inclined surface tapers radially inwardly away from the base wall of the closure and is positioned for engaging the top surface portion of the finish and the inner surface of the container and out of engagement with the outer surface of the finish of the container. The plastic closure is made by forming a closure with a base wall having an inner planar surface and compression molding a liner on the planar surface of the plastic closure. The step of compression molding the liner is such as to form the liner with a periphery spaced radially inwardly of the peripheral skirt and the threads on the skirt as well as the outer surface of the finish. The step of forming the liner includes forming the peripheral portion of the liner such that it has an outer surface being positioned for engaging the top surface portion of the finish and the inner edge of the container and being out of engagement with the outer surface of the container.

DESCRIPTION OF THE DRAWINGS

FIG. 1 is a fragmentary perspective view of a package comprising a plastic carbonated beverage closure and container embodying the invention.

FIG. 2 is a fragmentary vertical sectional view taken on an enlarged scale.

FIG. 3 is a fragmentary vertical sectional view of a portion of FIG. 2 on an enlarged scale.

DESCRIPTION OF THE PREFERRED EMBODIMENT

Figure 4:
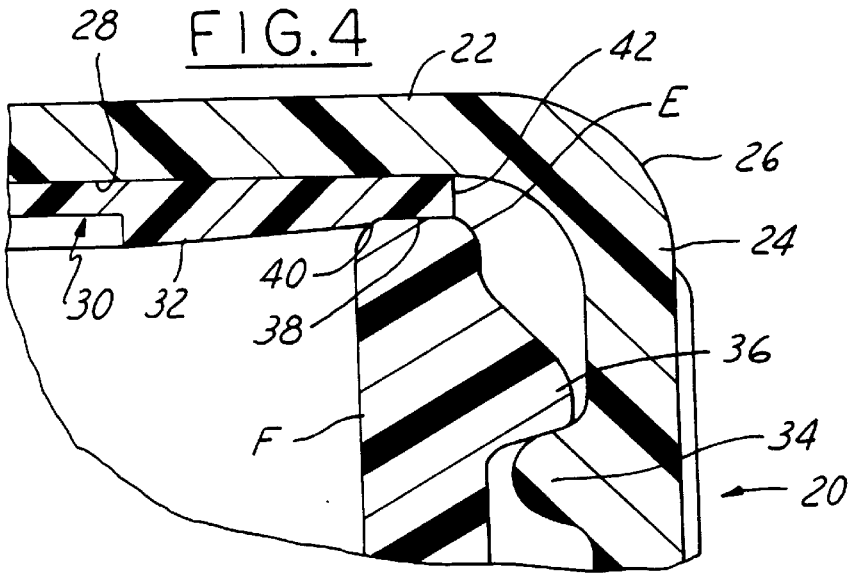
FIG. 4 is a fragmentary sectional view of a portion of FIG. 3 on a further enlarged scale.
Figure 5:
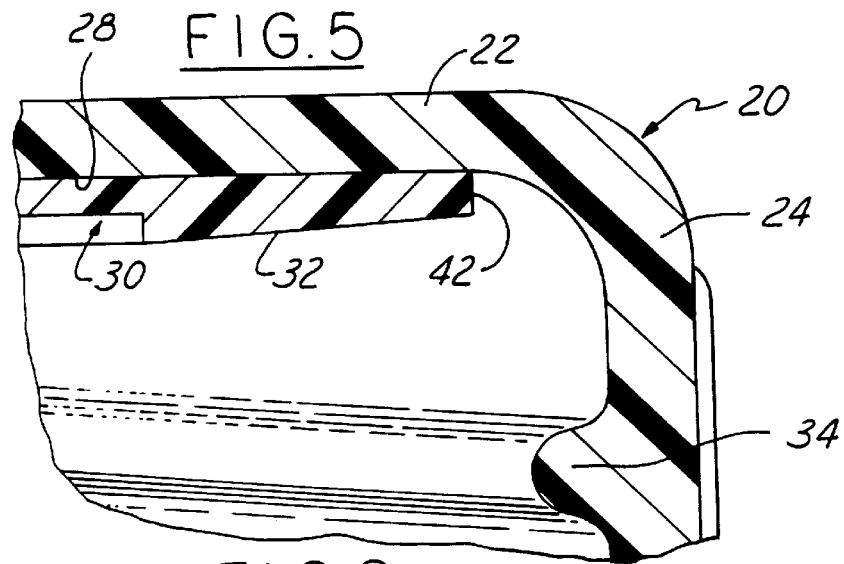
FIG. 5 is a fragmentary sectional view of the closure shown in FIG. 4 without the container in position.
Figure 6:
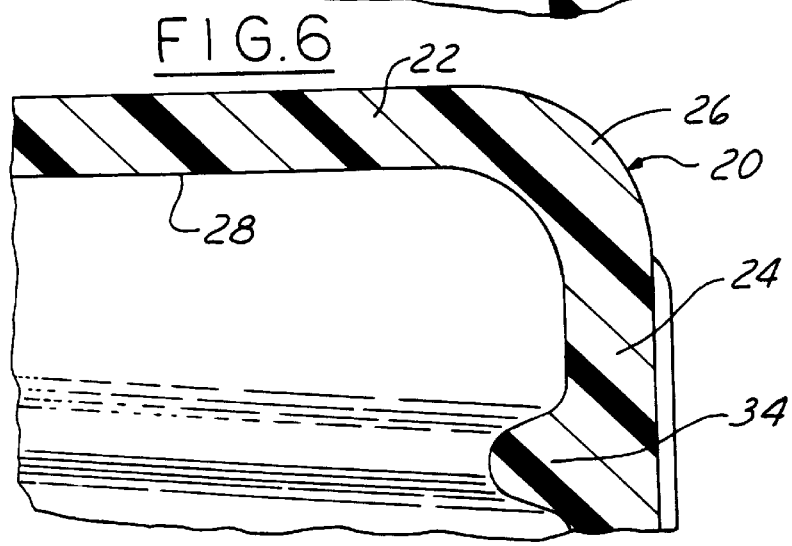
FIG. 6 is a fragmentary sectional view similar to FIG. 5 showing the closure before the compression molded liner is in place.

Referring to FIGS. 1–8, the package embodying the invention comprises a plastic closure 20 threaded on a container C, herein shown as a plastic container. The closure 20 is made of thermoplastic material such as polypropylene or polyethylene for glass and plastic containers including containers that are made of PET (polyethylene terphthalate).

The plastic closure 20 includes a base wall 22 and a peripheral annular skirt 24 joined by an arcuate wall 26. The base wall 22 has a substantially uniform thickness throughout and defines an inner planar surface 28 for receiving a liner 30. The arcuate portion 26 has substantially the same thickness as the base wall 22.

A liner 30 of resilient material is compression molded in situ on the inner surface 28. The liner 30 has a substantially uniform thickness. The liner 30 has a diameter less than the diameter of the portion of the skirt 24 axially adjacent the liner 30, thereby defining an annular space S. The liner 30 includes an annular tapered or inclined surface 32 on the periphery of the liner 30 which tapers or inclines radially inwardly and axially away from the base wall 22 of the plastic closure 20. The plastic closure 20 includes threads 34 on the inner surface of skirt 22 engaging threads 36 on the finish F of the container C.

The liner material may comprise any known material that can be extruded and cut off to provide changes for compression molding an apparatus such as shown, for example, in U.S. Pat. Nos. 3,955,605, 4,080,136 and 4,277,431. The liner material must also match other closure requirements including satisfactory removal torque, carbonation retention, carbonation retention under top load and satisfactory functioning on a container when cycled through environmental changes of temperature and humidity. A satisfactory material is a blend of an ethylene vinyl acetate composition and a thermoplastic elastomeric composition, such as that of U.S. Pat. No. 4,984,703 incorporated herein by reference. Such a composition will function satisfactorily for glass containers as well as plastic containers. Other types of materials that function satisfactorily for certain types of containers are ethylene vinyl acetate compositions, thermoplastic elastomeric compositions and thermoplastic compositions.

The plastic closure 20 is also preferably provided with a tamper indicating band B which may be of any well known type but is preferably that shown and claimed in U.S. Pat. No. 5,090,788, incorporated by reference. The tamper indicating band is attached to the skirt by a plurality of weakened portions defining a line of severing. An annular flange extends axially upwardly and inwardly from the tamper indicating band toward the base wall of the closure and comprises a first continuous annular flange portion connected to the band by a hinge portion and a second portion which has free ends of the segment portions engaging beneath the bead on the container when the closure is threaded onto the container. In one form the second portion comprises a plurality of segment portions extending upwardly and inwardly from the first continuous portion. In another form, the second portion comprises a second continuous flange portion. The flange is bent intermediate its ends so that the second portion extends inwardly at a greater angle than the first continuous flange portion. Other types of tampering indicating bands may also be used, as is well known in the art.

In use, the plastic closure 20 is applied to a container C after it has been filled and the closure is threaded onto the finish F at a predetermined torque. When a user desires to access the beverage, the user unthreads the closure causing the tamper indicating band to be severed. As the closure is being unthreaded, the seal is first released and the contents vented before the threads are disengaged.

As shown in FIGS. 2–4, when the closure 20 is fully applied to the finish F of the container C, the inclined outer surface 32 on the periphery of the liner 30 engages the upper surface 38 of the finish F and the inner edge 40 of the finish F but is not in engagement with the outer surface or the outer edge E of the finish F. The free edge 42 of liner 30 defines a diameter that is less than the outer diameter of the finish F such that the seal is confined to the majority of the inner portion of the upper surface 38. The principal sealing force is at the inner edge 40.

Figure 7:
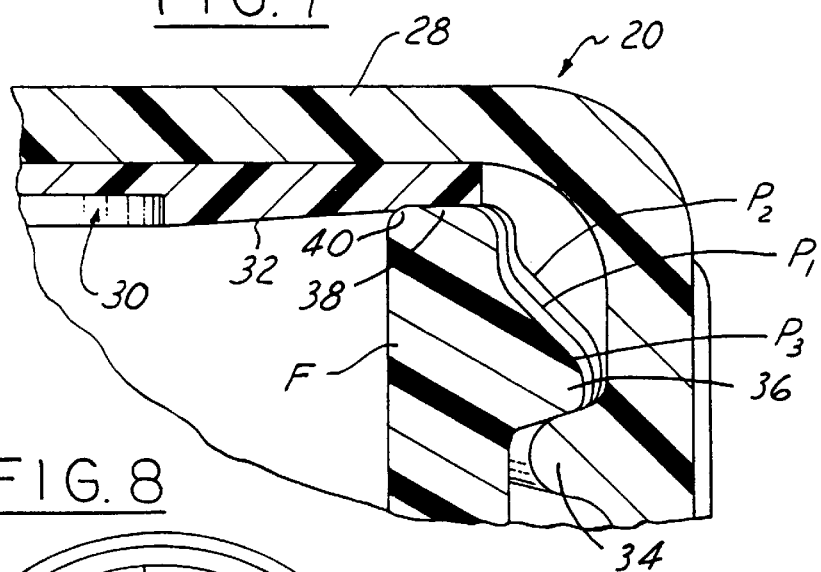
FIG. 7 is a diagrammatic view of the plastic closure and container showing the accommodation of the liner to manufacturing tolerances in the finish of the container.
Figure 8:
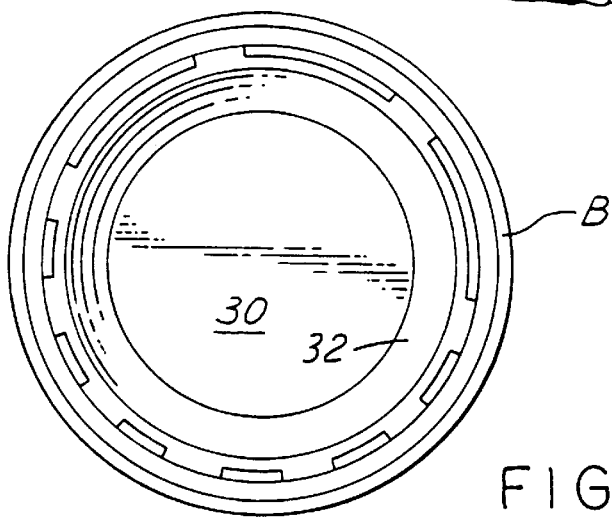
FIG. 8 is a bottom plan view of the closure shown in FIG. 6.

As shown in FIG. 7, which is a diagrammatic view, the closure embodying the invention is able to accommodate the tolerances in glass and plastic containers, and provide a satisfactory seal. The lines show the nominal dimension $P_1$, maximum dimension $P_2$ and minimum dimension $P_3$.

The angle that the inclined surface 32 forms with a plane at a right angle to the axis of the closure ranges between one degree at a minimum to fifteen degrees at a maximum. Very satisfactory results have been achieved when the angle is about four degrees. Preferably, the angle should be between about four degrees and ten degrees.

The type of closure shown in FIGS. 1–8 has a relatively thin base wall 22 such that it can be used as a vacuum closure on a container filled with hot contents, and when the contents cool, the base wall 22 flexes axially inwardly to provide visual tamper indicating features. When the closure is unthreaded from the container, the base wall flexes to its unstressed condition. Such a vacuum closure must meet test requirements including vacuum retention; strip torque, wet and dry; zero leakage; removal torque; visual flexing; drop tests; top load tests; vibration tests; temperature cycling; vent tests; and tamper band performance where it is used.

Figure 9:
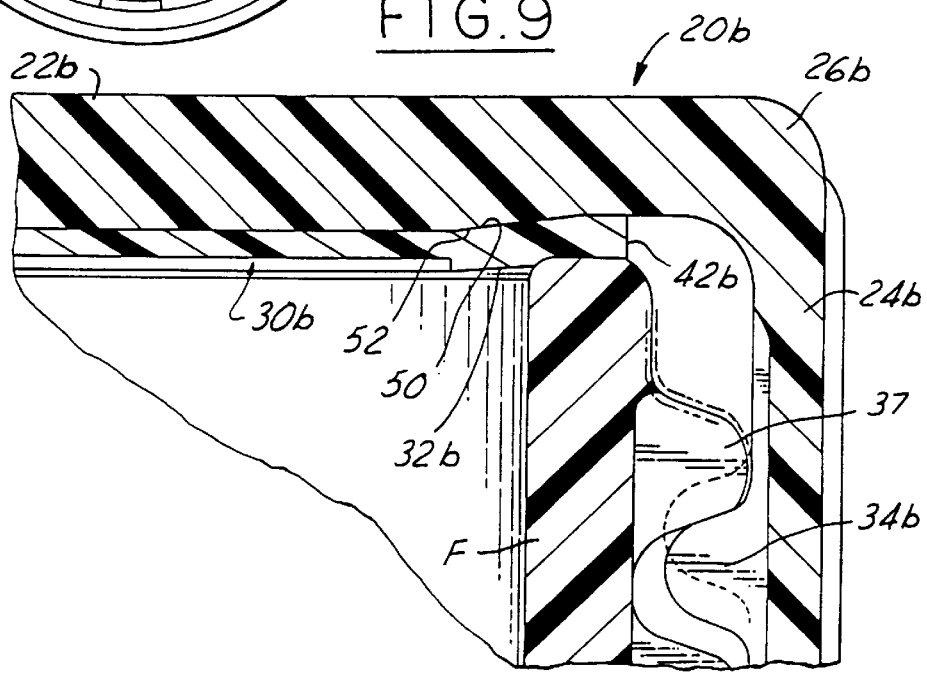
FIG. 9 is a fragmentary sectional view on an enlarged scale of a modified form of package.
Figure 10:
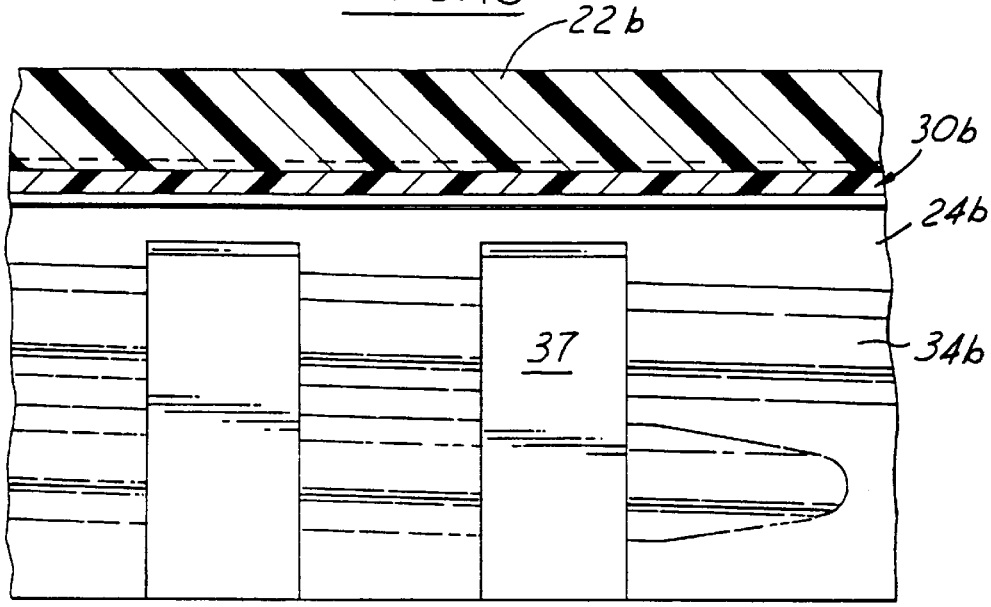
FIG. 10 is a fragmentary sectional view taken from the left in FIG. 9.

In the form of the invention shown in, FIGS. 9 and 10, the package is intended for carbonated beverages. Accordingly, the base wall 22b of closure 20b is made thicker to withstand the pressure of carbonated beverages. The package further includes interrupted threads 36b that define axial vent passages 37 in the threads 36b in a manner well known in the art. The liner 30b has an outer surface like that shown in FIGS. 1–8. The liner 30b includes an outer peripheral inclined surface 32b and a peripheral edge 42b. Liner 30b includes an inner peripheral surface 50 that tapers upwardly and outwardly and extends along a complementary surface 52 on the base wall 22b of the closure 20b. Surface 32b engages the upper surface 38b of the finish and the inner edge 40b of the finish and is not in engagement with the outer edge E of the finish F. The free edge 42b of the liner 30b defines a diameter less than the outer diameter of the finish such that the seal is confined to the majority of the inner portion of the finish. It has been found that the plastic closure, when used for carbonated beverages, functions satisfactorily for beverage packages of closures and containers.

Figure 11:
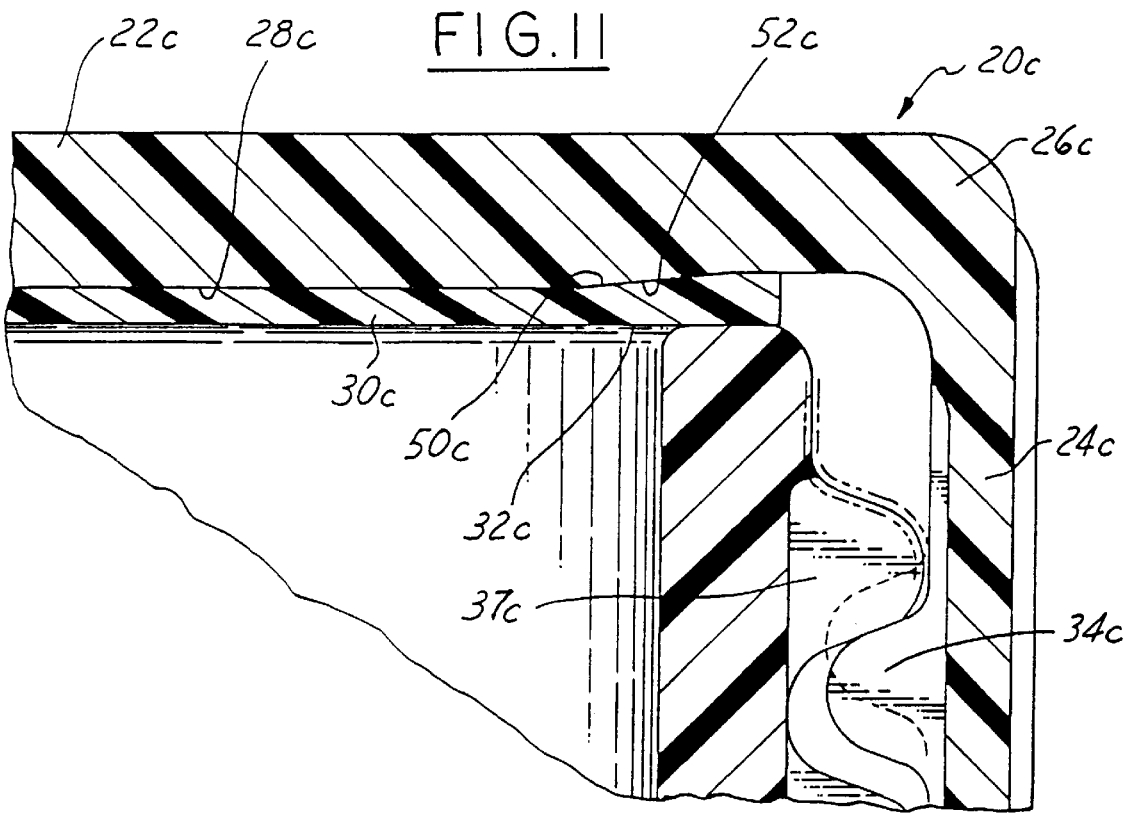
FIG. 11 is a fragmentary sectional view on an enlarged scale of another form of package.

In the form shown in FIG. 11, the package is also intended for use with carbonated beverages. Closure 20c is substantially identical to closure 20b shown in FIGS. 9 and 10 and includes a thickened base wall 22c which has a peripheral annular inner surface 52c that inclines upwardly and outwardly toward a thinner peripheral portion of the base wall 22c which merges with the arcuate annular wall 26c. The liner 30c is formed with a flat outer surface 32c, an upper inner inclined surface 50c complementary to base surfaces 22c and a tapered annular surface 50c complementary to tapered surface 52c.

Such carbonated beverage closures as described above must meet the customer test requirements which include removal torque; carbonation retention, leakage; top load; and air content.

Figure 12:
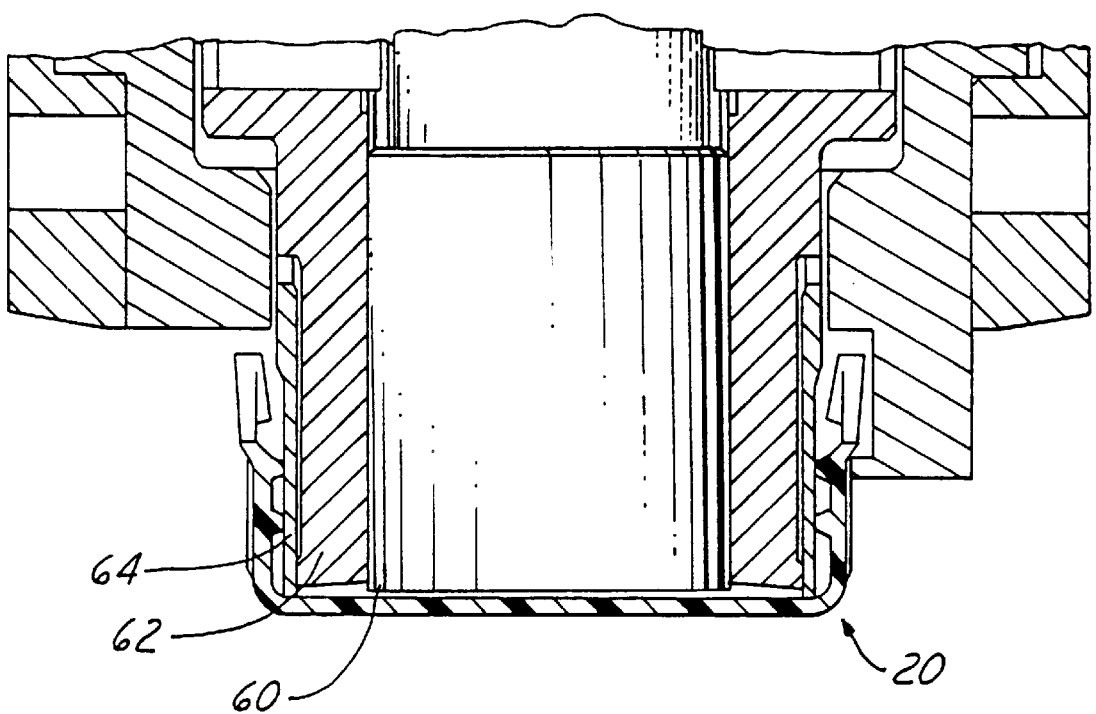
FIG. 12 is a fragmentary part sectional view of tooling for compression molding the liner in a closure.

Referring to FIG. 12, typical tooling for compression molding the liner in a closure comprises a core 60, an intermediate sleeve 62 and an outer sleeve 64 which define the cavity into which the liner is to be formed.

In the method of forming the above-described closures, a pellet of plastic material is delivered to the interior of the closure and the tooling is moved into the cavity. The sleeve 64 of the tooling engages the base wall of the closure to seal against the base wall of the closure and form a cavity about the pellet and the interior tip or core 60 and sleeve 62 of the tooling are moved axially to compress the pellet onto the liner 30. It has been found that the resultant lined closure can be made at high speeds eliminating flash and voids.

It can be seen that there has been provided a plastic closure and a method of making the plastic closure wherein the plastic closure has a configuration such that the plastic closure will provide an effective seal on glass and plastic containers while at the same time providing a positive shut off; wherein there is a more uniform flow of the liner material during compression molding thereby eliminating flash or voids; which can be used as a vacuum closure for containers filled with hot contents; which can be used as a closure for containers filled with non-carbonated cold liquids; and which can be used for containers containing carbonated beverages.

I claim:

1. A plastic closure for a container, said closure comprising:
    a base wall,
    a peripheral skirt having an inner surface and a central closure axis,
    interengaging means on said inner surface of said skirt for engaging a container,
    said base wall having an inner substantially planar surface,
    a liner compression molded on said inner surface of said base wall,
    said liner having a periphery with a peripheral edge spaced radially inwardly from said peripheral skirt and said interengaging means on said skirt,
    said periphery of said liner including an outer surface spaced axially from said base wall, said outer surface being inclined inwardly toward the axis of said closure and axially away from said base wall,
    said inclined outer surface on said periphery of said liner extending continuously from said peripheral edge of said liner at a constant angle radially and axially of said base wall.

2. The plastic closure set forth in claim 1 wherein said base wall is sufficiently thin such that it will flex inwardly due to a vacuum developed when the closure is applied to a container filled with hot contents and the contents thereafter cool.

3. The plastic closure set forth in claim 1 wherein said base wall of said closure is sufficiently thick such that it will not flex when applied to a filled container.

4. The plastic closure set forth in claim 1 wherein said interengaging means comprises threads, said threads including axial slots defining vents such that the closure is adapted to be used on a container filled with carbonated beverages.

5. The plastic closure set forth in claim 4 wherein said closure has a base wall sufficiently thick such that it will not flex.

6. The plastic closure set forth in claim 4 wherein said base wall of said closure includes an inner surface having an annular peripheral surface tapering from said planar surface axially upwardly and outwardly.

7. The plastic closure set forth in claim 6 wherein the liner has an upper surface complementary to the planar surface and tapered surface of said base wall.

8. The plastic closure set forth in any one of claims 1–7 wherein the angle which the inclined surface of said liner forms with a plane at a right angle to the axis of said closure ranges between one and fifteen degrees.

9. The plastic closure set forth in any one claims 1–7 wherein the angle which the inclined surface of said liner forms with a plane at a right angle to the axis of said closure ranges between four and ten degrees.

10. The plastic closure set forth in any one of claims 1–7 wherein the angle which the inclined surface of said liner forms with a plane at a right angle to the axis of said closure is about four degrees.

11. A package comprising:
    a plastic closure, and
    a container having a finish with a top surface portion, a cylindrical inner surface portion, a cylindrical outer surface portion, and a curved surface portion at the juncture of the top surface portion and the outer surface portion,
    said closure comprising a base wall,
    a peripheral skirt having an inner surface and a central closure axis,
    interengaging means on said inner surface of said skirt for engaging the finish of the container,
    said base wall having an inner substantially planar surface,
    a liner compression molded on said inner surface of said base wall,
    said liner having a periphery with a peripheral edge spaced radially inwardly from said peripheral skirt and said interengaging means on said skirt,
    said periphery of said liner including an outer surface spaced axially from said base wall, said outer surface being inclined inwardly toward the axis of said closure and axially away from said base wall, said inclined outer surface on said periphery of said liner extending continuously from said peripheral edge at a constant angle radially and axially of said base wall.

12. The package set forth in claim 11 wherein said base wall is sufficiently thin such that it will flex inwardly due to vacuum developed when the closure is applied to a container filled with hot contents and the contents thereafter cool.

13. The package set forth in claim 11 wherein said base wall of said closure is sufficiently thick such that it will not flex when applied to a filled container.

14. The package set forth in claim 11 wherein said interengaging means comprise threads, said threads including axial slots defining vents such that the closure is adapted to be used on a container filled with carbonated beverages.

15. The package set forth in claim 14 wherein said closure has a base wall sufficiently thick such that it will not flex.

16. The package set forth in claim 15 wherein said base wall of said closure includes an inner surface having an annular peripheral surface tapering from said planar surface axially upwardly and outwardly.

17. The package set forth in claim 16 wherein the liner has an upper surface complementary to the planar surface and tapered surface of said base wall.

18. The package set forth in any one of claims 11–17 wherein the angle which the inclined surface of said liner forms with a plane at a right angle to the axis of said closure ranges between one and fifteen degrees.

19. The package set forth in any one of claims 11–17 wherein the angle which the inclined surface of said liner forms with a plane at a right angle to the axis of said closure ranges between four and ten degrees.

20. The package set forth in any one of claims 11–17 wherein the angle which the inclined surface of said liner forms with a plane at a right angle to the axis of said closure is about four degrees.

* * * * *